United States Patent
Duh et al.

(10) Patent No.: US 7,291,201 B2
(45) Date of Patent: Nov. 6, 2007

(54) METHOD FOR MAKING NANO-SCALE LEAD-FREE SOLDER

(75) Inventors: Jeng-Gong Duh, Hsinchu (TW); Li-Yin Hsiao, Tainan (TW)

(73) Assignee: National Tsing Hua University, Hsinchu (TW)

( * ) Notice: Subject to any disclaimer, the term of this patent is extended or adjusted under 35 U.S.C. 154(b) by 513 days.

(21) Appl. No.: 10/928,203

(22) Filed: Aug. 30, 2004

(65) Prior Publication Data
US 2006/0042415 A1 Mar. 2, 2006

(51) Int. Cl.
*B22F 9/24* (2006.01)
(52) U.S. Cl. .......................... 75/351; 75/371
(58) Field of Classification Search ............ 75/351, 75/371
See application file for complete search history.

(56) References Cited

U.S. PATENT DOCUMENTS

| | | | |
|---|---|---|---|
| 6,210,556 B1* | 4/2001 | Toben et al. | 205/253 |
| 6,607,653 B1* | 8/2003 | Tsuji et al. | 205/241 |
| 2003/0000846 A1* | 1/2003 | Rzenik et al. | 205/263 |
| 2005/0184369 A1* | 8/2005 | Sonoda et al. | 257/677 |
| 2005/0260430 A1* | 11/2005 | Kuroda et al. | 428/570 |
| 2007/0037377 A1* | 2/2007 | Richardson et al. | 438/613 |

OTHER PUBLICATIONS

Kim, J.Y. et al., "The Effects of Electroplating Parameters on the Composition and Morphology of Sn-Ag Solder", Journal of Electronic Materials, vol. 33, No. 12, pp. 1459-1464, 2004.*

* cited by examiner

*Primary Examiner*—George P. Wyszomierski
(74) *Attorney, Agent, or Firm*—Birch, Stewart, Kolasch & Birch, LLP

(57) ABSTRACT

A method for making Nano-scale lead-free solder includes the following steps of: forming a mixture solution Sn-Ag or Sn-Ag-Cu; making $NaBH_4$, NaOH and alkyl $C_{12}H_{25}OSO_3Na$ to a reducing dispersing solution; producing reactant Sn-Ag or Sn-Ag-Cu by means of the oxidation reduction method; and adding 95% ethanol to be mixed, and cleaning the reactant by using a supersonic vibrator for removing boron (B) and sulfur (S) atom which adhere to the reactant, thereby producing the Nano-scale (0.1~100 nm) lead-free solder Sn-3.5Ag or Sn-3.5Ag-xCu (x=0.2~1.0).

4 Claims, 5 Drawing Sheets

METHOD FOR MAKING NANO-SCALE LEAD-FREE SOLDER

FIELD OF THE INVENTION

The present invention relates to a method for making Nano-scale lead-free solder, and more particularly to a method for making Nano-scale (0.1~100 nm) lead-free solder.

BACKGROUND OF THE INVENTION

A solder of a contact mainly provides electric conductivity and mechanical strength disposed between an electronic component and a circuit board and is a path for spreading heat during operation, and therefore the solder is very important to an electronic product. Conventional tin-lead (Sn-Pb) solder has low cost, good wetting property, proper fusing point, proper electric conductivity, proper mechanical strength and proper thermal conductivity, and therefore tin-lead (Sn-Pb) solder has been widely applied in the field of industry. However, lead (Pb) is a toxic heavy metal, and seriously affects the health of a human body. Thus, various countries gradually instituted laws and decrees to restrain or stop using the solder with lead. In 1998, a conference of global same trade organization was held in Wiesbaden, Germany by PCB makers from various countries, and it was concluded that various countries would stop using the solder with lead commencing in 2004. Although the conclusion to stop using the solder with lead was changed from 2004 to July, 2006 for some reason, the lead-free solder would still become a challenge for the electronic industry in the future.

When the Nano-scale Electronic Age began, electronic devices leaned towards minimization, low lightweight and high functional requirement and electronic packaging technology leaned towards higher I/O density and shorter contact pitch. Thus, the high density connection technologies, such as flip chip connection, chip scale package (CSP) and direct chip attachment (DCA), became the main stream of the future electronic packaging technology, but the technology of connection between components became a key technology.

As the minimization of an integrated circuit (IC) and the complexity of a circuit are required, the soldering point of the corresponding electronic component leans towards minimization. Conventional solder is formed by "an electroplate method" or "a silk screen printing method". However, the above-mentioned methods mostly form micrometer-scale solder (100~1000 nm), and cannot form a useful Nano-scale (0.1~100 nm) lead-free solder according to the Nano-scale (0.1~100 nm) soldering point of the electronic component.

SUMMARY OF THE INVENTION

It is an object of the present invention to provide a method which can improve the size of conventional lead-free solder and make Nano-scale (0.1~100 nm) lead-free solder. The method is effectively applied to the process of commercial mass production.

It is another object of the present invention to provide a method for making various Nano-scale (0.1~100 nm) lead-free solder of Sn-3.5Ag and Sn-3.5Ag-xCu (x=0.2~1.0).

In order to achieve the foregoing objects, the present invention provides a method for making Nano-scale lead-free solder including the following steps of: (a) mixing a pre-determined amount of $SnSO_4$ (aq) and a pre-determined amount of $AgNO_3$(aq) to 0.4 liter and then forming a mixture solution of Sn-Ag which has a weight ratio of Sn and Ag being 96.5:3.5; (b) making a reducing dispersing solution comprising NaBH4 and 1 M NaOH as reducing agents and 0.01 M alkyl sodium sulfate ($C_{12}H_{25}OSO_3Na$) as a dispersing agent per liter of solution; (c) adding the mixture solution of Sn-Ag in step (a) to the reducing dispersing solution during fast stirring of the reducing dispersing solution, thereby producing reactant Sn and Ag by means of the oxidation reduction between both solutions; and (d) settling the reactant in step (c), then adding an ethanol concentration at 95%, and cleaning the reactant by using a supersonic vibrator for removing boron (B) and sulfur (S) atom which adhere to the reactant, thereby producing the Nano-scale lead-free solder Sn-3.5Ag.

The present invention further provides a method for making Nano-scale lead-free solder including the following steps of: (a) mixing a pre-determined amount of $SnSO_4$(aq), a pre-determined amount of $AgNO_3$(aq) and $Cu(NO_3)_2$(aq) to 0.4 liter and then forming a mixture solution of Sn-Ag-Cu which has a weight ratio of Sn, Ag and Cu being (96.5-x): 3.5:x, wherein x=0.2~1.0; (b) making a reducing dispersing solution comprising NaBH4 and 1 M NaOH as reducing agents and 0.01 M alkyl sodium sulfate ($C_{12}H_{25}OSO_3Na$) as a dispersing agent per liter of solution; (c) adding the mixture solution of Sn-Ag-Cu in step (a) to the reducing dispersing solution during fast stirring of the reducing dispersing solution, thereby producing reactant Sn, Ag and Cu by means of the oxidation reduction between both solutions; and (d) settling the reactant in step (c), then adding an ethanol concentration at 95%, and cleaning the reactant by using supersonic vibration of a supersonic vibrator for removing boron (B) and sulfur (S) atom which adhere to the reactant, thereby producing the Nano-scale lead free solder Sn-3.5Ag-xCu, wherein x=0.2~1.0.

The foregoing, as well as additional objects, features and advantages of the invention will be more readily apparent from the following detailed description, which proceeds with reference to the accompanying drawings.

DESCRIPTION OF THE PREFERRED EMBODIMENTS

The present invention provides a method for making Nano-scale lead-free solder, and the lead-free solder is Sn-3.5Ag (96.5Sn-3.5Ag), i.e. the weight ratio of Sn to Ag is 96.5:3.5 by means of metal material mixture. The method includes the following steps of:

(a) mixing a pre-determined amount of $SnSO_{4(aq)}$ and a pre-determined amount of $AgNO_{3(aq)}$ to 0.4 liter and then forming a mixture solution of Sn-Ag which has a weight ratio of Sn and Ag being 96.5:3.5;

(b) making a reducing dispersing solution comprising $NaBH_4$ and 1 M NaOH as reducing agents and 0.01 M alkyl sodium sulfate ($C_{12}H_{25}OSO_3Na$) as a dispersing agent per liter of solution, wherein the number of moles the reducing agent $NaBH_4$ is 5 times the total number of moles $SnSO_{4(aq)}$ and $AgNO_{3(aq)}$ in step (a);

(c) adding the mixture solution of Sn-Ag in step (a) to the reducing dispersing solution during fast stirring of the reducing dispersing solution, thereby producing reactant Sn and Ag by means of the oxidation reduction between both solutions; and (d) settling the reactant in step (c), then adding an ethanol concentration at 95%, and cleaning the reactant by using supersonic vibration of a supersonic vibrator for removing boron (B) and sulfur (S) atom which adhere to the reactant, thereby producing the Nano-scale (0.1~100 nm) lead-free solder Sn-3.5Ag.

Figure 1:
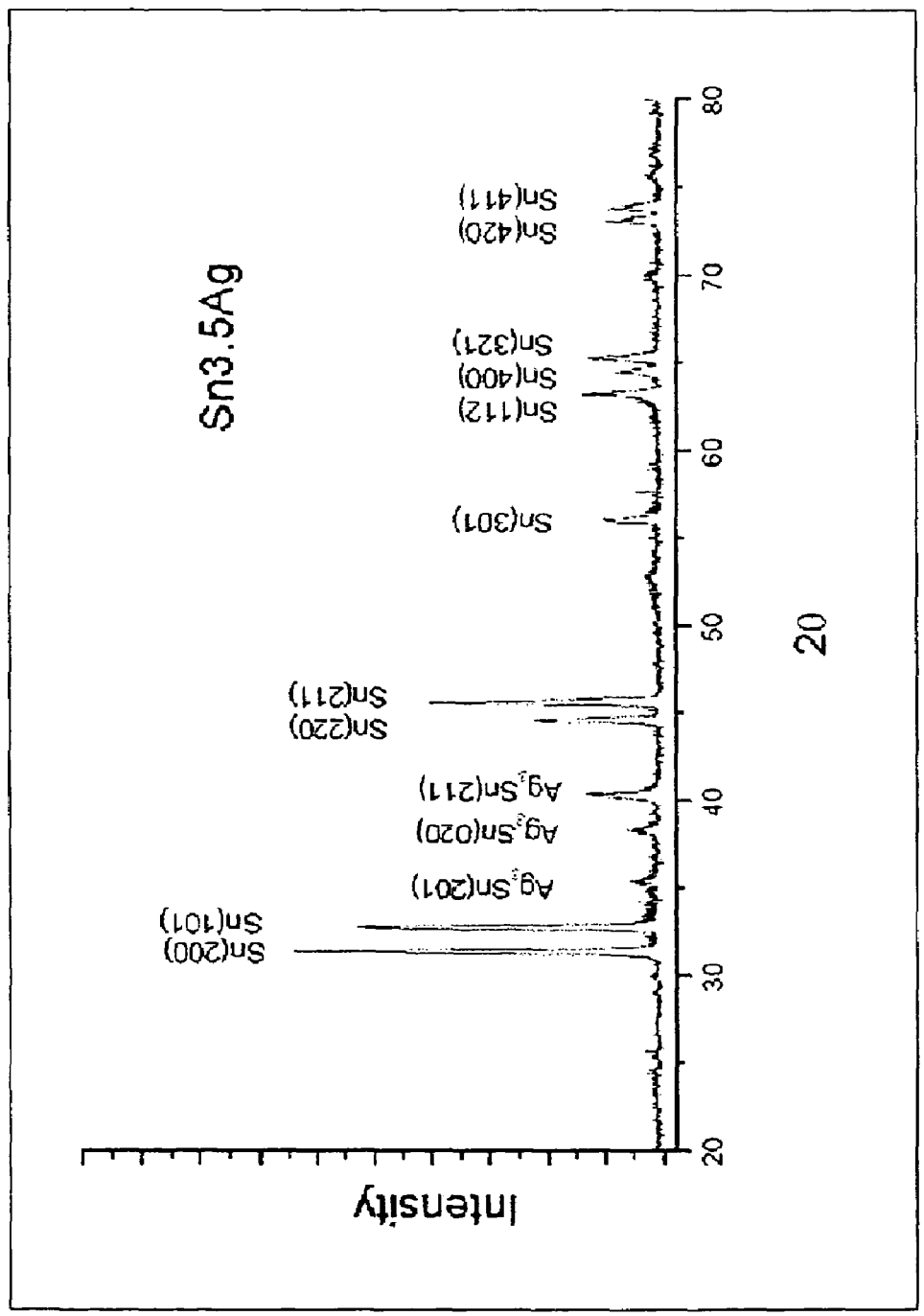
FIG. 1 is a XRD diagram showing the Nano-scale lead-free solder Sn-3.5Ag produced by the present invention.
Figure 2:
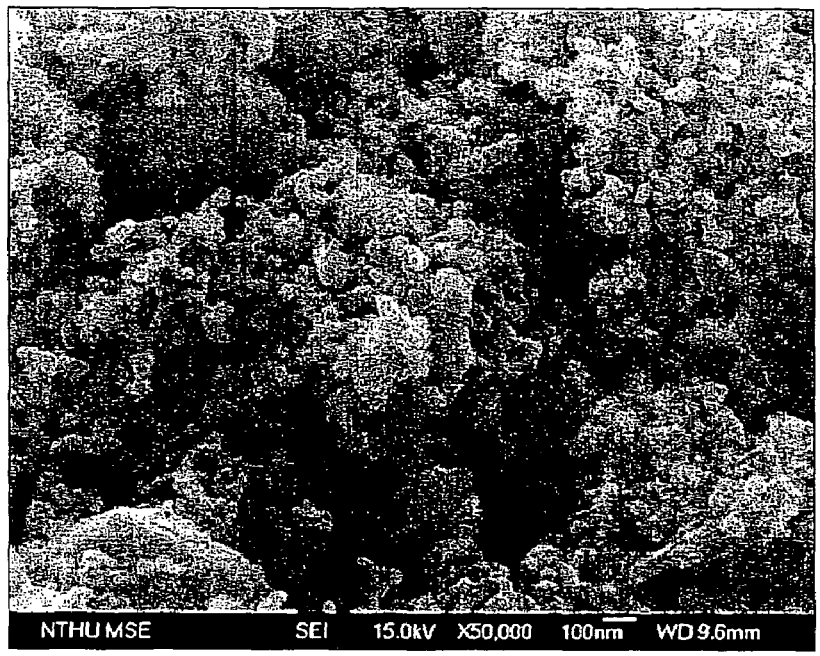
FIG. 2 is a SEM image showing the lead-free solder Sn-3.5Ag produced by the present invention.

FIG. 1 is a XRD diagram showing the Nano-scale lead-free solder Sn-3.5Ag produced by the present invention by utilizing X-ray diffractometer (XRD). As the phase of $Ag_3Sn$ is shown in FIG. 1, the Nano-scale lead-free solder Sn-3.5Ag of the present invention is a uniformly mixed lead-free solder Sn-3.5Ag. FIG. 2 is an SEM image showing the lead-free solder Sn-3.5Ag produced by the present invention by utilizing scanning electron microscopy (SEM).

The present invention provides another method for making Nano-scale lead-free solder, and the lead-free solder Sn-3.5Ag-xCu (x=0.2~1.0) is also produced by an oxidation reduction method, i.e., the lead-free solder is a metal material mixture which includes Sn, Ag and Cu. The method includes the following steps of:

(a) mixing a pre-determined amount of $SnSO_{4(aq)}$, a pre-determined amount of $AgNO_{3(aq)}$ and $Cu(NO_3)_{2(aq)}$ to 0.4 liter and then forming a mixture solution of Sn-Ag-Cu which has a weight ratio of Sn, Ag and Cu being (96.5-x):3.5:x, wherein x=0.2~1.0;

(b) making a reducing dispersing solution comprising $NaBH_4$ and 1 M NaOH as reducing agents and 0.01 M alkyl sodium sulfate ($C_{12}H_{25}OSO_3Na$) as a dispersing agent per liter of solution, wherein the number of moles the reducing agent $NaBH_4$ is 5 times the total number of moles $SnSO_{4(aq)}$ and $AgNO_{3(aq)}$ in step (a);

(c) adding the mixture solution Sn-Ag-Cu in the step (a) to the reducing dispersing solution during fast stirring of the reducing dispersing solution, thereby producing reactant Sn, Ag and Cu by means of the oxidation reduction between both solutions; and (d) settling the reactant in step (c), then adding an ethanol concentration at 95%, and cleaning the reactant by using supersonic vibration of a supersonic vibrator for removing boron (B) and sulfur (S) atom which adhere to the reactant, thereby producing the Nano-scale (0.1~100 nm) lead-free solder Sn-3.5Ag-xCu (x=0.2~1.0).

Figure 4:
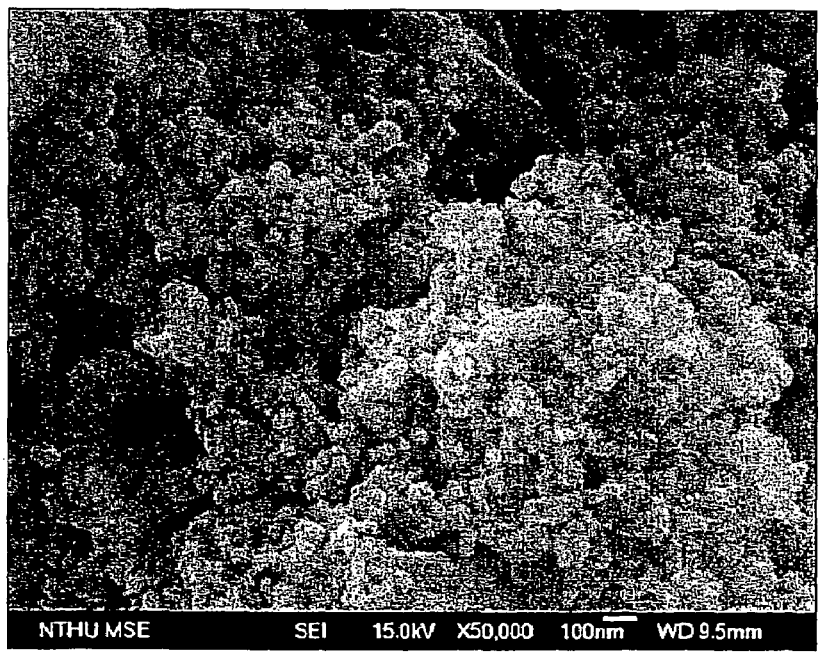
FIG. 4 is a SEM image showing the lead-free solder Sn-3.5Ag-0.2Cu produced by the present invention.
Figure 3:
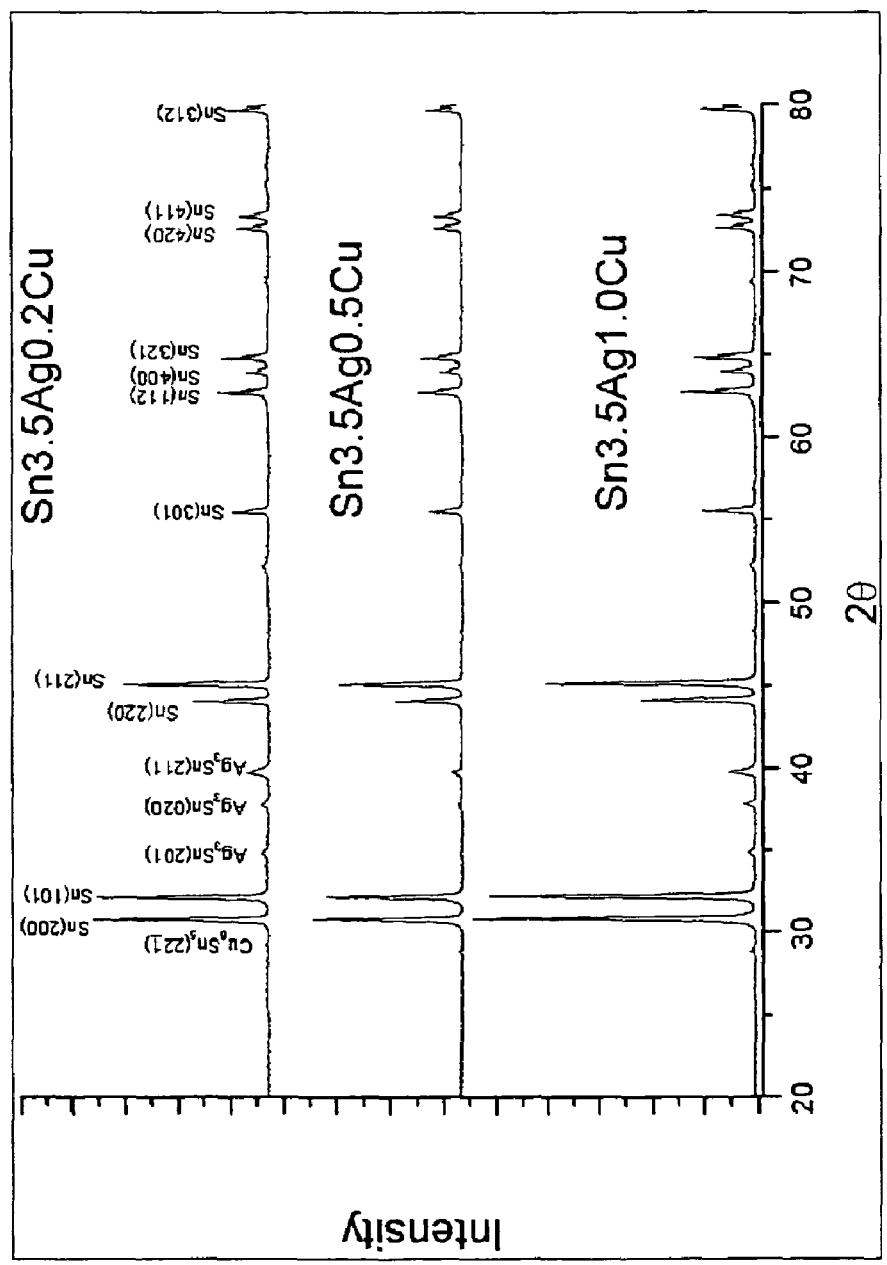
FIG. 3 is a XRD diagram showing the Nano-scale lead-free solder Sn-3.5Ag-0.2Cu, Sn-3.5Ag-0.5Cu and Sn-3.5Ag-1.0Cu produced by the present invention.
Figure 5:
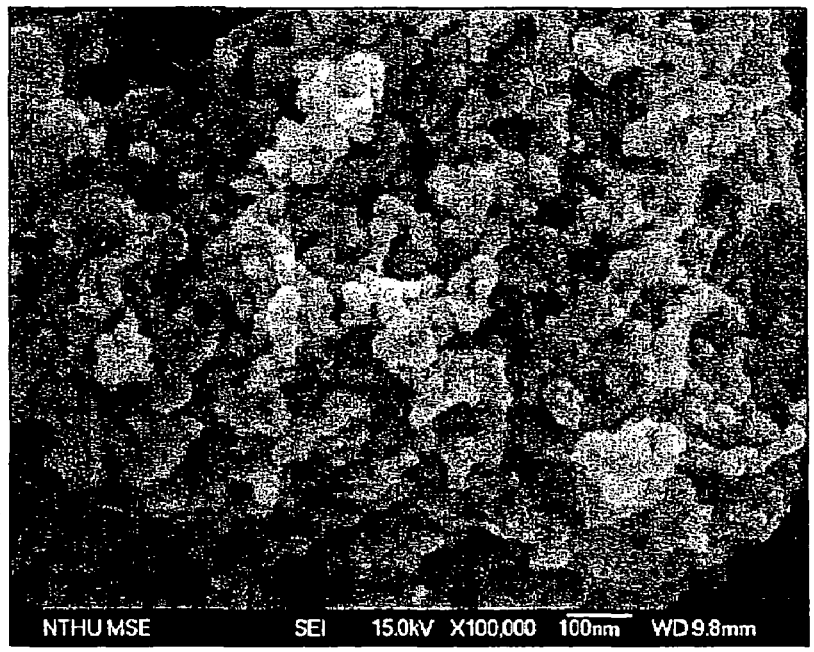
FIG. 5 is a SEM image showing the lead-free solder Sn-3.5Ag-0.5Cu produced by the present invention.
Figure 6:
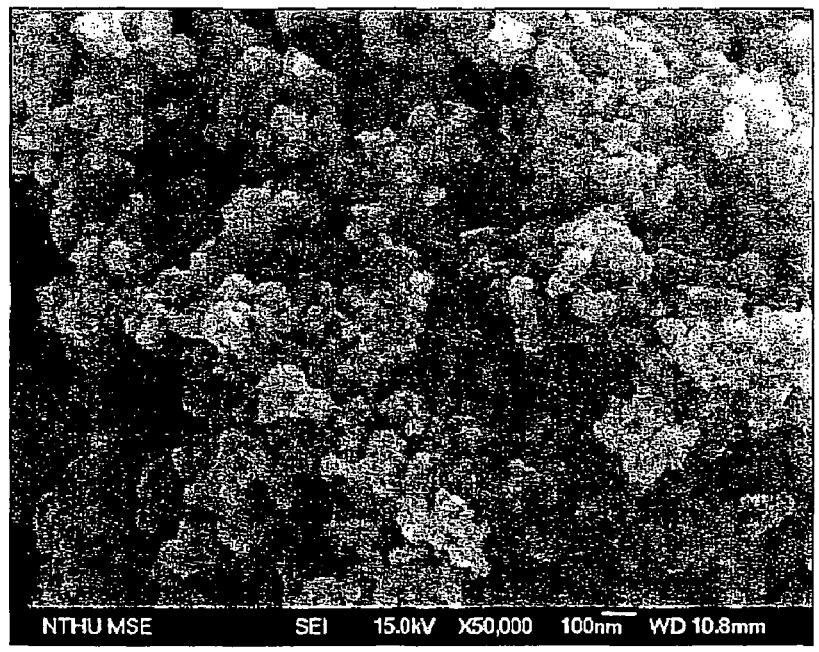
FIG. 6 is a SEM image showing the lead-free solder Sn-3.5Ag-1.0Cu produced by the present invention.

FIG. 3 is a XRD diagram showing the Nano-scale lead-free solder Sn-3.5Ag-0.2Cu, Sn-3.5Ag-0.5Cu and Sn-3.5Ag-1.0Cu produced by the present invention by utilizing X-ray diffractometer (XRD). As the phase of $Ag_3Sn$ and $Cu_6Sn_5$ is shown in FIG. 3, the Nano-scale lead-free solder Sn-3.5Ag-xCu (x=0.2~1.0) of the present invention is a uniformly mixed lead-free solder Sn-3.5Ag-xCu (x=0.2~1.0). FIGS. 4 to 6 are SEM images showing the lead-free solder Sn-3.5Ag-0.2Cu, Sn-3.5Ag-0.5Cu and Sn-3.5Ag-1.0Cu produced by the present invention by utilizing scanning electron microscopy (SEM).

Figure 7:
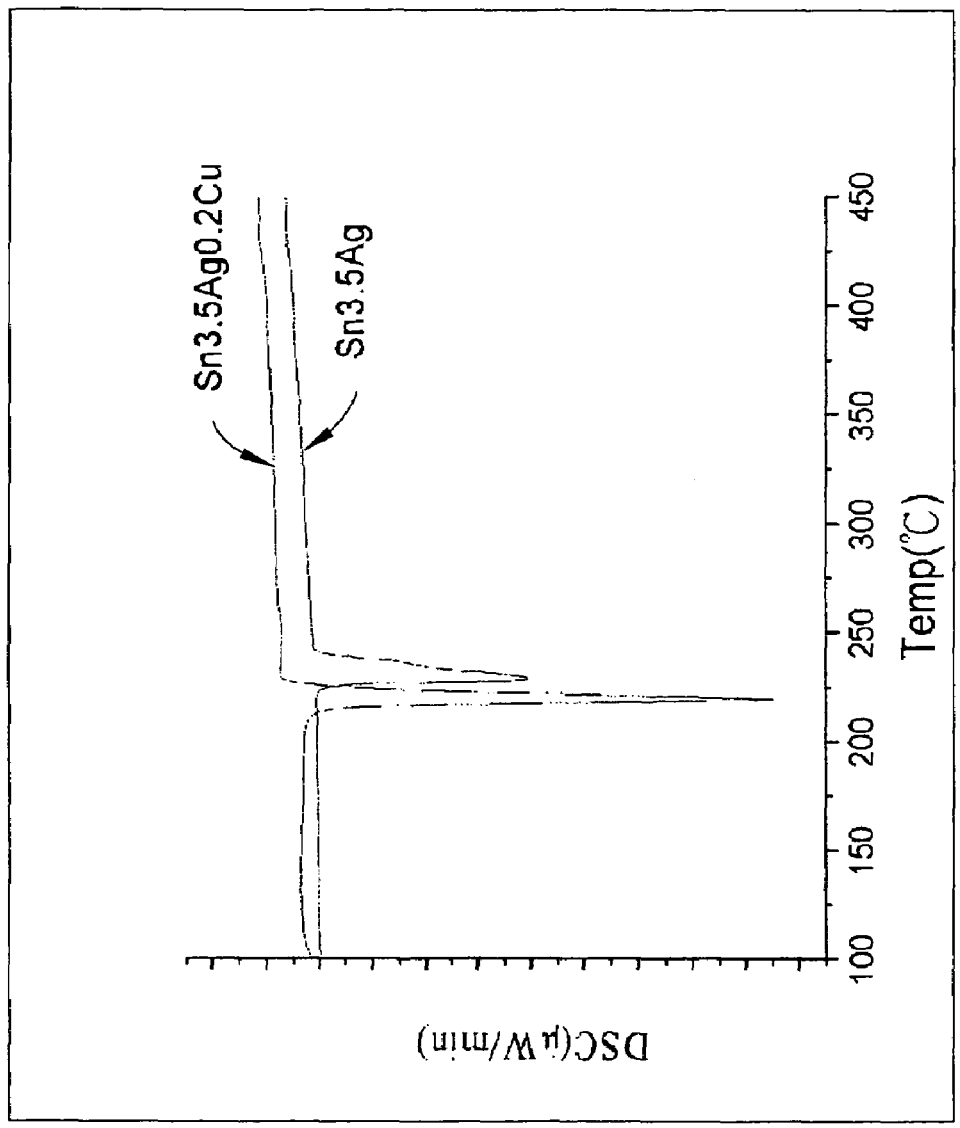
FIG. 7 is a DSC diagram showing the Nano-scale lead-free solder Sn-3.5Ag and Sn-3.5Ag-0.2Cu produced by the present invention.

FIG. 7 is a differential scanning calorimetry (DSC) diagram showing the Nano-scale lead-free solder Sn-3.5Ag and Sn-3.5Ag-0.2Cu produced by the present invention. As the measured curves of Sn-3.5Ag and Sn-3.5Ag-0.2Cu are shown in FIG. 7, there is one absorption peak only, such that the Nano-scale (0.1~100 nm) lead-free solder Sn-3.5Ag and Sn-3.5Ag-0.2Cu of the present invention is a uniformly mixed lead-free solder.

The above-mentioned examples only disclose some of the preferred embodiments of the present invention. The condition of method for making the Nano-scale lead-free solder includes the solution having metal ion of Sn, Ag and Cu which all can depend on the metal mixture of the lead-free solder.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A method for making Nano-scale lead-free solder, the lead-free solder being Sn-3.5Ag (96.5Sn-3.5Ag), comprising the following steps of:

(a) mixing a pre-determined amount of $SnSO_4$(aq) and a pre-determined amount of $AgNO_3$(aq) to 0.4 liter and then forming a mixture solution of Sn-Ag which has a weight ratio of Sn and Ag being 96.5:3.5;

(b) making a reducing dispersing solution comprising $NaBH_4$ and 1 M NaOH as reducing agents and 0.01 M alkyl sodium sulfate ($C_{12}H_{25}OSO_3Na$) as a dispersing agent per liter of solution;

(c) adding the mixture solution Sn-Ag from step (a) to the reducing dispersing solution during fast stirring of the reducing dispersing solution, thereby producing reactant Sn and Ag by means of the oxidation reduction between both solutions; and (d) settling the reactant from step (c), then adding an ethanol concentration at 95%, and cleaning the reactant by using a supersonic vibrator for removing boron (B) and sulfur (S) atom which adhere to the reactant, thereby producing the Nano-scale lead-free solder Sn-3.5Ag.

2. The method according to claim 1, wherein the number of moles of the reducing agent $NaBH_4$ is 5 times the total number of moles of $SnSO_4$(aq) and $AgNO_3$(aq) in step (a).

3. A method for making Nano-scale lead-free solder, the lead-free solder being Sn-3.5Ag-xCu (x=0.2~1.0), comprising the following steps of:

(a) mixing a pre-determined amount of $SnSO_4$(aq), a pre-determined amount of $AgNO_3$(aq) and $Cu(NO_3)_2$(aq) to 0.4 liter and then forming a mixture solution Sn-Ag-Cu which has a weight ratio of Sn, Ag and Cu being (96.5-x):3.5:x, wherein x=0.2~1.0;

(b) making a reducing dispersing solution comprising $NaBH_4$ and 1 M NaOH as reducing agents and 0.01 M alkyl sodium sulfate ($C_{12}H_{25}OSO_3Na$) as a dispersing agent per liter of solution;

(c) adding the mixture solution Sn-Ag-Cu from the step (a) to the reducing dispersing solution during fast stirring the reducing dispersing solution, thereby producing reactant Sn, Ag and Cu by means of the oxidation reduction between both solutions; and (d) settling the reactant from the step (c), then adding an ethanol concentration at 95%, and cleaning the reactant by using supersonic vibration of a supersonic vibrator for removing boron (B) and sulfur (S) atom which adhere to the reactant, thereby producing the Nano-scale lead-free solder Sn-3.5Ag-xCu, wherein x=0.2~1.0.

4. The method according to claim 3, wherein the number of moles of the reducing agent $NaBH_4$ is 5 times the total number of moles of $SnSO_4(aq)$ and $AgNO_3(aq)$ in step (a).

* * * * *